United States Patent
Wolf et al.

(10) Patent No.: US 6,226,790 B1
(45) Date of Patent: *May 1, 2001

(54) METHOD FOR SELECTING OPTIMAL PARAMETERS FOR COMPILING SOURCE CODE

(75) Inventors: Michael Wolf, New York, NY (US); Dror Maydan, Palo Alto, CA (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,224

(22) Filed: Feb. 28, 1997

(51) Int. Cl.$^7$ .................................................. G06F 9/445
(52) U.S. Cl. .......................... 717/9; 717/2; 717/3; 717/4; 717/5; 717/6; 717/7; 717/8
(58) Field of Search ..................................... 395/709, 708, 395/707, 706; 717/1, 2, 3, 4, 5, 6, 7, 8, 9, 10, 11

(56) References Cited

U.S. PATENT DOCUMENTS

| | | | |
|---|---|---|---|
| 5,442,790 | * 8/1995 | Nosenchuck | 395/707 |
| 5,485,619 | * 1/1996 | Lai et al. | 395/706 |
| 5,535,393 | * 7/1996 | Reeve et al. | 395/706 |
| 5,790,859 | * 8/1998 | Sarkar | 395/704 |
| 5,805,863 | 9/1998 | Chang | 3995/500 |
| 5,809,308 | * 9/1998 | Tirumalai | 395/709 |
| 5,842,022 | * 11/1998 | Nakahira et al. | 395/709 |
| 5,862,384 | * 1/1999 | Hirai | 395/709 |
| 5,867,711 | * 2/1999 | Subramanian et al. | 395/709 |
| 5,910,900 | * 6/1999 | Mangelsdorf | 395/500.27 |
| 5,920,724 | * 7/1999 | Chang | 395/709 |
| 5,930,507 | * 7/1999 | Nakahira et al. | 395/705 |
| 5,940,620 | * 8/1999 | Graham | 395/707 |
| 5,956,498 | * 9/1999 | Mangelsdorf | 395/500.03 |

OTHER PUBLICATIONS

Swamy Punyamurtula et al, "Minimum Dependence Distance Tiling of Nested Loops with Non–uniform Dependences", IEEE pp. 74–81, Apr. 1994.*
Josep Torrellas et al, "Optimizing Instruction Cache Performance for Operating System Intensive Workloads", IEEE pp. 360–369, Feb. 1995.*
Michael E. Wolf et al, "Combining Loop Transformations Considering Caches and Scheduling", IEEE pp. 274–286, Jan. 1996.*
Lam et al., "The Cache Performance and Optimizations of Blocked Algorithms", ACM, pp. 63–74, 1991.
Llaberia et al., "Performance evaluation of tiling for the register level", IEEE pp. 254–265, Feb. 1998.*
Ferrante et al., "Hierarchical tiling for improved superscalar performance", IEEE pp. 239–245, Apr. 1995. performance.*

* cited by examiner

*Primary Examiner*—Tariq R. Hafiz
*Assistant Examiner*—Ted T. Vo
(74) *Attorney, Agent, or Firm*—Wagner, Murabito & Hao LLP

(57) ABSTRACT

In a computer system, a method for determining an optimal loop interchange, set of register tiling amount, and cache tiling size for compiling source code into object code. The method first constructs a model of the specific computer system upon which the object code is to be run. Next, the search space comprising all of the different possibilities of the loop interchanges, register tiling amounts, and cache tiling sizes is run through the model to determine estimated times of execution. The particular loop interchange, set of register tiling amounts, and cache tiling sizes corresponding to the best estimated time of execution is then selected as being the most optimal. The source code is then compiled according to this optimal loop interchange, register tiling amount, and cache tiling size.

12 Claims, 4 Drawing Sheets

$$\begin{pmatrix} a_{11} & a_{12} & a_{13} \\ a_{21} & a_{22} & a_{23} \\ a_{31} & a_{32} & a_{33} \end{pmatrix} \times \begin{pmatrix} b_{11} & b_{12} & b_{13} \\ b_{21} & b_{22} & b_{23} \\ b_{31} & b_{32} & b_{33} \end{pmatrix} = \begin{pmatrix} c_{11} & c_{12} & c_{13} \\ c_{21} & c_{22} & c_{23} \\ c_{31} & c_{32} & c_{33} \end{pmatrix}$$

FIGURE 3

METHOD FOR SELECTING OPTIMAL PARAMETERS FOR COMPILING SOURCE CODE

FIELD OF THE INVENTION

The present invention pertains to compilers. More particularly, the present invention optimizes code transformations for attaining superior overall performance.

BACKGROUND OF THE INVENTION

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions stored in its memory. These programs, and their series of instructions, are collectively referred to as software. Software is key to utility of computers. Software is what makes the computer devices function and perform useful tasks. Good software makes for effective machines, whereas poor software makes for difficult to use, less effective machines. Thus, the utility of the computer device often hinges upon the utility of the software written for the device.

Software is written by professionals referred to as programmers or software engineers. As programs have become larger and more complex, the task of writing software has become correspondingly more difficult. As a result, programmers typically code in "high level languages" to improve productivity. The use of high level language makes the task of writing extremely long and complex programs more manageable. The completed program, however, must be translated into machine executable language in order to run on a computer. Programmers rely upon compilers to translate their program written in high level language into a program comprised of machine executable code, known as "machine language."

Compiler efficiency and sophistication is directly related to the speed and reliability of the machine executable code. The process of translating the program written in high level language into a program written in machine language is referred to as compiling. The actual translation is performed by a software program referred to as a compiler. The compiler operates on the program written in high level language. The high level language program is referred to as source code. The compiler translates the source code into machine executable code. Ultimately, it is the machine executable code which will run on the computer. Thus, the speed and reliability of the executable code depends upon the performance and efficiency of the compiler. If the compiler is inefficient, the machine executable code will run slower. Other attributes, such as executable code size and reliability, may also be affected. Hence, it is critical to the speed and efficiency of the program that the compiler thoroughly optimizes the executable code during the translation process.

There are several different methods and techniques used to optimize source code. One technique, commonly referred to as "loop interchange," involves changing the order in which loops are executed. Rather than executing loops according to the way that the human programmer had originally written the computer program, the compiler rearranges the loops into a different, more efficient order so that the code can be executed much faster without impacting the final result. Another technique, known as "cache tiling" or "blocking," involves the compiler breaking large operational blocks into several smaller blocks. Subdividing the larger blocks into smaller blocks generally reduces the total number of cache misses that are required. Reducing the number of cache misses, directly increases the speed at which the code may be executed. Yet another method for improving the execution speed involves "register tiling" or "unrolling." A register tiling process further subdivides operations blocks so as to minimize the number of loads and stores which are required. Associated with any given hardware design is a limited number of registers. By keeping data in registers for an elapsed period of time, data items need not be loaded to or stored from memory each time the data is accessed.

In the past, various compilers have used one or more of these techniques to optimally compile their code. First, loop interchange as applied to change the ordering of the loops. The resulting code was then altered according to the most optimal cache tiling. Next, the modified code was then changed to reflect the most optimal register tiling. However, it has been discovered by the present inventors that although each of these techniques separately optimizes the code, that their final combined effects might not produce the most optimal performance. This is due to the observation made by the present inventors that these techniques are highly interdependent. Changing one of these factors transforms the other techniques. For instance, optimizing loop ordering might cause register tiling to become worse or vice versa. In addition, the various transformations might have contradictory effects on different characteristics of the machine that contribute to performance. For example, one loop ordering may improve cache behavior, but it might also seriously degrade scheduling behavior.

Thus, there is a need in the prior art for a compiler that can automatically determine how best to transform source code considering the tree optimizations discussed and considering various machine characteristics such as caches and instruction scheduling. The present invention provides a highly effective, elegant solution to this problem by employing a total machine model to estimate performance characteristics for a wide range of transformations; the set of transformations which produces the best overall execution time estimate is then selected.

SUMMARY OF THE INVENTION

The present invention pertains to a method for determining an optimal loop interchange, set of register tiling amount, and cache tiling size for compiling source code into object code. It has been discovered that these different parameters are highly interdependent. Optimizing just one of the factors separately, might adversely affect the performance characteristics of the other parameters. In order to find the particular loop interchange, set of register tiling amount, and cache tiling size for achieving the best overall performance, the present invention first constructs a model of the specific computer system upon which the object code is to be run. Next, the search space comprising all of the different possibilities of the loop interchanges, register tiling amounts, and cache tiling sizes is run through the model. The model calculates an estimated performance rating for each of the possible combinations based on anticipated cache misses, instruction schedules, and loop overhead. The particular loop interchange, set of register tiling amounts, and cache tiling sizes corresponding to the best estimated performance is then selected as being the most optimal. The source code is then compiled according to this optimal loop interchange, register tiling amount, and cache tiling size.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows an example of a large complex matrix multiplication which can more efficiently be processed by utilizing cache tiling.

DETAILED DESCRIPTION

A compiler for optimizing code transformations is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
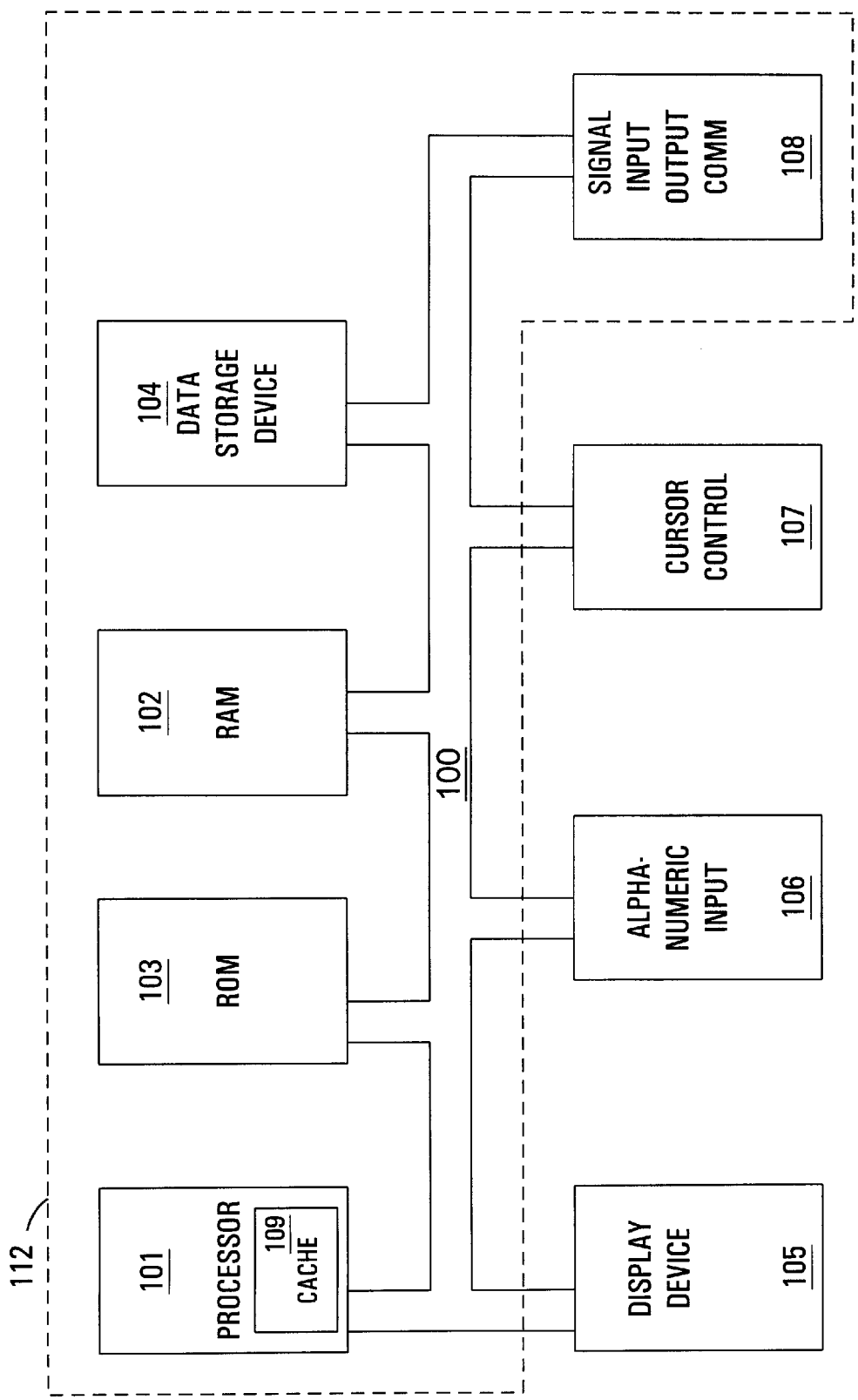
FIG. 1 shows an exemplary computer system upon which the present invention may be practiced.

Referring to FIG. 1, an exemplary computer system 112 upon which the present invention may be practiced. It is appreciated that the computer system 112 of FIG. 1 is exemplary only and that the present invention can operate within a number of different computer systems including general purpose computers, embedded computes, portable computers, and computer systems specially adapted for graphics display. Computer system 112 of FIG. 1 includes an address/data bus 100 for communicating information between the various components. A central processor unit 101 is coupled to the bus 100. It is used for processing information and instructions. Also coupled to bus 100 is a random access memory 102 (e.g., DRAM) for storing information and instructions for the central processor 101. A small cache memory 109 resides within microprocessor 101. Processor 101 reads data from and writes data to cache 109. Occasionally, data from main memory 102 is loaded into cache 109 and the main memory 102 is updated with the most recent data from cache 109. A read only memory (ROM) 103 is used for storing semi-permanent information and instructions for the processor 101. The compiler may be stored within ROM 103. For storing vast amounts of data, a data storage device 104 (e.g., a magnetic or optical disk and disk drive) is coupled to bus 100. Finally, an I/O unit 108 is used to interface the computer system 112 with external devices (e.g., keyboard, modem, network interface, display, mouse, etc.). Externally, a display device 105 is coupled to bus 100 for displaying information (e.g., graphics, text, spreadsheets, etc.) to a computer user. An alphanumeric input device 106 (e.g., a keyboard) is used for communicating information and command selections to the central processor 101. Optionally, a cursor control device 107 (e.g., a mouse, trackball, etc.) is used for communicating user input information and command selections to the central processor 101.

Figure 2:
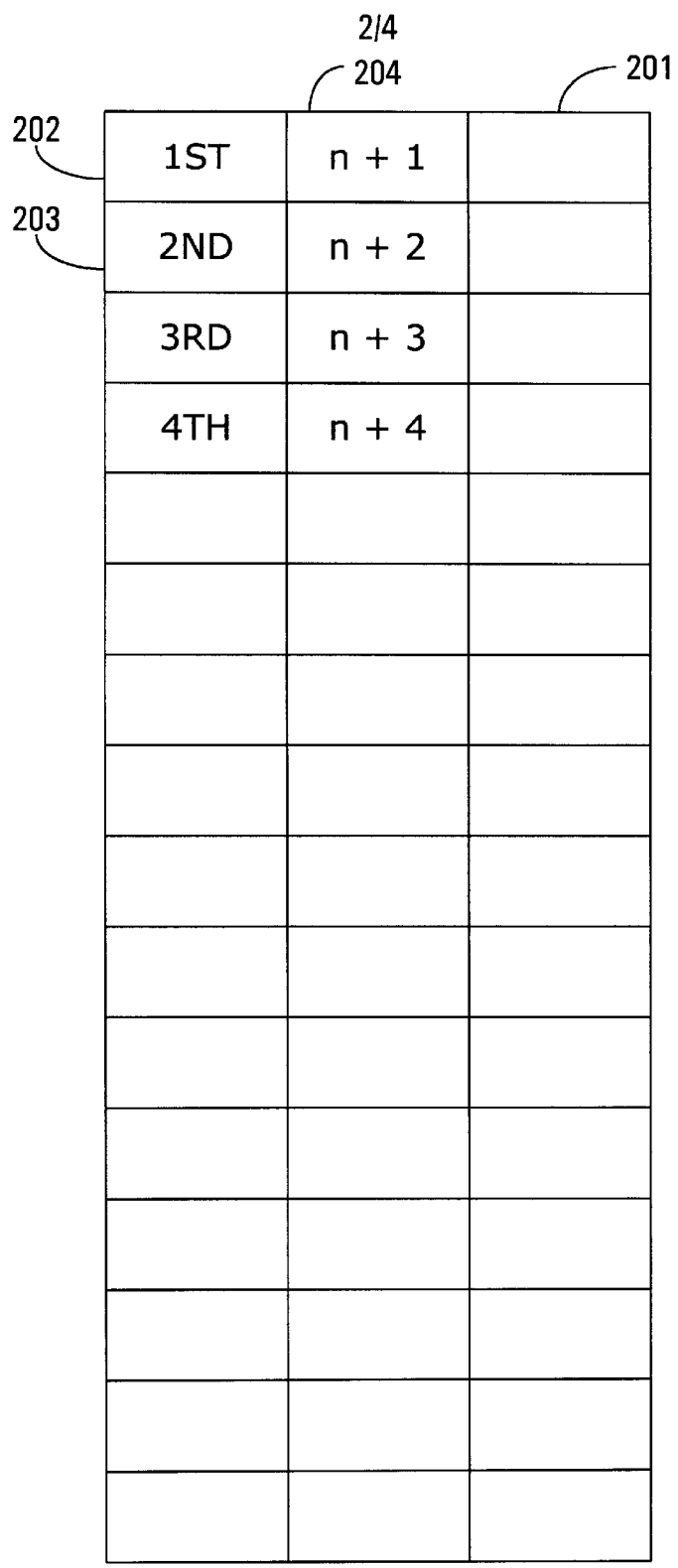
FIG. 2 shows a block of memory comprised of a number of rows and columns of entries.

FIG. 2 shows a block of memory 201 comprised of a number of rows and columns of entries. When a microprocessor performs a load or store operation, it first accesses a small cache memory. The cache memory (SRAM) is fast, but it is relatively expensive. Hence, a small amount of cache memory is interposed between the microprocessor and the main memory which is comprised of slower, but less expensive DRAM. If the desired data is not currently contained within the cache, the data is read from the main memory and loaded into the cache. Furthermore, the next fifteen entries are also loaded into the cache. For example, loading the first entry 202 into the cache also causes the entire first column of sixteen entries to also be loaded into the cache. If the next memory access is to the second entry 203, the data already resides within the cache (i.e., a cache "hit"). However, if the next request were to entry 204, then this would result in a cache "miss" because the desired data is not within the cache. Consequently, a delay is incurred because the cache must be loaded with the desired data.

Loop interchange examines the loops within a piece of code to determine whether the loops can safely be rearranged. Rearranging loops can minimize cache misses, among other benefits. For example, the following code is not efficient because it results in numerous cache misses:

do $j$=1,200,000 do $i$=1,200,000

$a\ (j,i)$=0

The first iteration causes a(1,1) to be loaded into the cache. However, in the second iteration the reference to a (1,2) results in a cache miss because it does not follow a(1,1). The reference to a (1,3) in the third iteration also results in a cache miss. Likewise, the fourth iteration reference to a (1,4) results in a cache miss. Servicing these cache misses is quite expensive in the amount of extra delays which are incurred. A more efficient code for achieving the same function is shown below:

do $i$=1,200,000 do $j$=1,200,000

$a(j,i)$=0

The first iteration causes a(1,1) to be loaded into the cache. The second iteration, references a(2,1), which already exists in the cache because it was loaded when a(1,1) was loaded. Thus, this loop arrangement performs the same functions as the previous loops, except that it is much faster. The difference in speed between the two loop arrangements is more pronounced for larger loops.

Often, computers utilize matrices to perform complicated calculations. One method for making matrix operations more efficient involves cache tiling, also known as "blocking." In cache tiling, a large complex matrix multiplication, such as the one shown in FIG. 3, is further subdivided into several smaller blocks. Solving for these smaller blocks reduces the number of cache misses that are required. Generally, a large N×N matrix multiplication requires $N^3/16$ cache misses, assuming that 16 entries are loaded into the cache on each miss. However, with cache tiling, the same matrix multiplication can be accomplished with fewer cache misses. After cache tiling, the matrix multiplication can typically be performed with $N^3/(16B)$ cache misses, where B can often be as large as 200. The enhanced efficiency is due to the fact that with blocking, the cache need not be updated as frequently.

Yet another mechanism for improving the efficiency by which the software program is executed relates to register tiling, also known as "unroll and jam". By unrolling outer loops, register tiling keeps values in registers over multiple iterations of outer loops. This reduces the number of times a single value must be loaded or stored and thus reduces the number of loads and stores. However, keeping a value in a register prevents that register from being used for other purposes. Since there is a fixed number of hardware registers, there is a tradeoff involved in register tiling. The more one register tiles, the more loads and stores might be eliminated but the greater the chance that one might run out of registers.

It has been discovered in the present invention that these mechanisms for optimizing the computer program are highly interdependent. Changing one factor dramatically affects the performance characteristics of the other factors. Loop interchange, register tiling, and cache tiling are transformations that can effect the performance of a computer program by altering cache behavior, instruction scheduling, the ability to allocate registers, and loop overhead. Deciding which of these transformations to perform and exactly how to perform them is a difficult problem since their effects are highly interdependent. For example, whereas loop ordering may improve cache behavior, it might also hurt instruction scheduling behavior.

The present invention solves this problem by constructing a total machine model to estimate cache misses, instruction schedule, and loop overhead. This model estimates these performance characteristics based upon a given loop ordering, set of register tiling amounts, and cache tiling sizes. The entire search space is then enumerated by using an intelligent pruning approach. Based on the results, the set of transformations with the best overall execution time estimate is then selected. In other words, a trial and error approach is used. The computer systematically estimates the overall execution time for each different combination until all important possibilities have been covered. Thereupon, the combination with the fastest estimated speed is selected.

Figure 4:
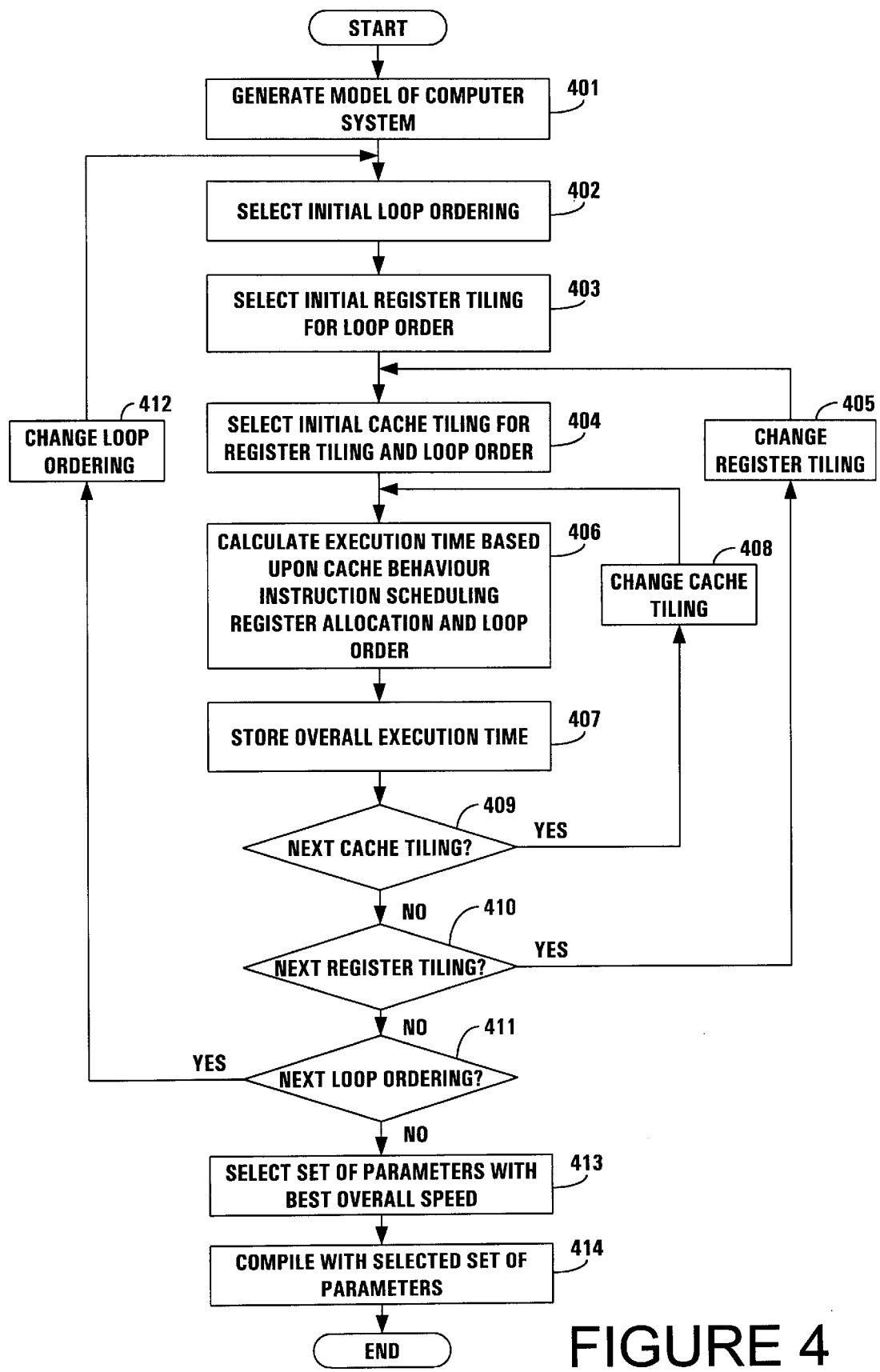
FIG. 4 is a flowchart describing the steps for optimizing code according to the currently preferred embodiment of the present invention.

FIG. 4 is a flowchart describing the steps for optimizing code according to the currently preferred embodiment of the present invention. Initially in step 401, a model of the computer system upon which the computer program being compiled is to run, is constructed. This model is a software simulation of the hardware platform that the compiled program is anticipated to run on. The model is constructed to match the specifications of the actual computer system as close as possible. Some of the parameters considered in the design of the computer model include the number and type of microprocessor(s), bus architecture, cache subsystem, clock speed, etc. Next, an initial set of parameters (e.g., loop ordering, set of register tiling amounts, and cache tiling sizes) are specified and entered into the computer model, steps 402,403 and 404. The time required to execute the computer program, given the inputted parameters, is then estimated, step 406. The estimated execution time for this particular set of parameters is stored into memory, step 407.

The above sequence of steps is repeated for every possible combination of parameters. For instance, steps 406–409 are repeated with a different cache tiling while the other two parameters remains the same. Steps 404–410 are repeated with different cache tiling and register tiling factors while loop ordering remains the same. Finally, steps 403–412 are repeated for different values of all three parameters. After the estimated execution times for all of the possible parameter combinations has been calculated and stored into memory, step 413 is performed. In step 413, the set of parameters with the fastest execution time is selected. These optimal parameters are then applied to compile the computer program, step 414.

The following is an example of the different combinations given three loops (i,j, and k), two register tiling amounts (A and B), and two cache tiling sizes (X and Y).

| Loop ordering | Register | Cache | Estimated Time |
| --- | --- | --- | --- |
| i, j, k | A | X | 3.15 |
| i, k, j | A | X | 3.49 |
| j, i, k | A | X | 3.23 |
| j, k, i | A | X | 3.36 |
| k, i, j | A | X | 3.50 |
| k, j, i | A | X | 3.41 |
| i, j, k | B | X | 3.33 |
| i, k, j | B | X | 3.49 |
| j, i, k | B | X | 3.26 |
| j, k, i | B | X | 3.42 |
| k, i, j | B | X | 3.89 |
| k, j, i | B | X | 3.75 |
| i, j, k | A | Y | 3.49 |
| i, k, j | A | Y | 3.15 |
| j, i, k | A | Y | 3.23 |
| j, k, i | A | Y | 3.36 |
| k, i, j | A | Y | 3.50 |
| k, j, i | A | Y | 3.41 |
| i, j, k | B | Y | 3.29 |
| i, k, j | B | Y | 3.17 |
| j, i, k | B | Y | 3.48 |
| j, k, i | B | Y | 3.72 |
| k, i, j | B | Y | 3.86 |
| k, j, i | B | Y | 3.70 |

By examining the estimated times of execution, it can be seen that the fastest time is 3.15. The parameters corresponding to this fastest time is a loop ordering of i, k,j; a register tiling size of A; and a cache tiling size of Y. Hence, the source code is compiled according to these parameters in order to achieve the fastest run time. It should be noted that in a real application, there may be hundreds or even thousands of different combinations. But the same principle holds for constructing a model, generating estimated run times for every possible combination, and selecting the set of parameters with the best estimated run time, regardless of the number of possible loops and tile sizes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system, a method for determining an optimal set of parameters for compiling source code into object code, comprising the steps of:
   a) constructing a model of a hardware design upon which the object code is to be run, wherein the model is a function of loop interchange, register tiling, and cache tiling;
   b) changing an order by which loops within the object code are executed;
   c) dividing a block of object code into a plurality of sub-blocks to minimize cache misses;

d) dividing one of the sub-blocks into a plurality of smaller sub-blocks to minimize a number of load and store operations to a given set of registers;

e) running the model with a plurality of different loop interchange, register tiling, and cache tiling characteristics;

f) measuring an estimated execution time based on the model each time a characteristic corresponding to loop interchange, register tiling, or cache tiling is changed, wherein the estimated execution time is a function of a combination of the loop interchange, register tiling, and cache tiling performances;

g) selecting an optimal set of loop interchange, register tiling, and cache tiling characteristics corresponding to a fastest estimated execution time;

h) compiling the source code according to the optimal set of loop interchange, register tiling, and cache tiling characteristics.

2. The method of claim 1, wherein the estimated execution time is generated by calculating cache misses, instruction schedules, and loop overheads.

3. The method of claim 1, wherein the estimated execution time is a function of cache behavior, instruction scheduling, register allocation, and loop overhead.

4. A computer-readable medium having stored thereon instructions for causing an optimal set of parameters to be selected for use in a compiler according to the following steps:

simulating a hardware design upon which the compiled source code is to be executed, wherein the simulation is based on loop interchange, register tiling, and cache tiling parameters;

specifying a combination of parameters related to loop interchange, register tiling, and cache tiling, wherein the parameters affect the performance characteristics of the compiled source code;

repeatedly changing at least one of the parameters associated with loop interchange, register tiling, or cache tiling, wherein changing one of the parameters affects an execution time of the compiled source code;

generating an estimated performance for the object code each time one parameter is changed, wherein the estimated performance is based on the combination of contribution from loop interchange, register tiling, and cache tiling on the simulated hardware design;

selecting an optimal set of parameters corresponding to a most optimal performance;

compiling the source code according to the optimal set of parameters.

5. The computer-readable medium of claim 4, wherein one of the parameters include loop interchange, wherein particular arrangements of loops corresponding to the source code is altered.

6. The computer-readable medium of claim 4, wherein one of the parameters include register tiling, wherein one operational block is divided to change a number of store and load operations into a register.

7. The computer-readable medium of claim 4, wherein one of the parameters include cache tiling, wherein one operational block is divided to change a number of cache misses.

8. The computer-readable medium of claim 4, wherein the performance is calculated according to cache misses, instruction schedules, and loop overheads.

9. The computer-readable medium of claim 4, wherein the performance is a function of cache behavior, instruction scheduling, register allocation, and loop overhead.

10. A computer system comprising:

a main memory for storing a source file;

a cache memory coupled to the main memory for storing parts of the source file;

a processor coupled to the cache memory, wherein the processor compiles the source file according to an optimal loop interchange, register tiling, and cache tiling, wherein the optimal loop interchange, register tiling, and cache tiling is selected according to the following steps:

specifying a plurality of different combinations of loop interchange, register tiling, and cache tiling, wherein changing one of the loop interchange, register tiling, or cache tiling characteristics affects overall performance;

simulating execution of the source file for each of the combinations to produce an estimated execution time, wherein the estimated time is a function of a combination of factors relating to the loop interchange, register tiling, and cache tiling;

selecting the optimal loop interchange, register tiling, and cache tiling according to a fastest simulated execution time;

compiling the source file into object code with the optimal loop interchange, register tiling, and cache tiling.

11. The computer system of claim 10, wherein the model calculates estimated cache misses, instruction schedules, and loop overheads for determining the performance if the source code were to be compiled according to a particular loop interchange, set of register tiling amount, and cache tiling size.

12. The computer system of claim 10, wherein the execution time is a function of cache behavior, instruction scheduling, register allocation, and loop overhead.

* * * * *